No. 670,154. Patented Mar. 19, 1901.
D. H. HOUSTON.
FOLDING PANORAMIC CAMERA.
(Application filed May 7, 1900.)
(No Model.)

Witnesses:
J. H. Gale
C. D. Field

Inventor:
David Henderson Houston

UNITED STATES PATENT OFFICE.

DAVID HENDERSON HOUSTON, OF HUNTER, NORTH DAKOTA.

FOLDING PANORAMIC CAMERA.

SPECIFICATION forming part of Letters Patent No. 670,154, dated March 19, 1901.

Application filed May 7, 1900. Serial No. 15,825½. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Folding Panoramic Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to photographic cameras, and has for its object the provision of a panoramic camera adapted to use rolls of sensitized film on the market and generally known as "daylight-loading film-cartridges."

My invention consists in novel features of construction and combination of parts, which are hereinafter described, and the novel features pointed out in the specification.

The principal object of my invention is the provision of a folding panoramic camera of novel construction wherein the bellows and lens are folded into the concave front compartment of the camera-case and the swinging lens-barrel is pivoted on a movable structure capable of extension forward and adapted to carry the optical center of the lens to a point equidistant from the circularly-positioned film-edge holders.

The invention further contains many novel features, combined with the basic principle elements of the invention, and the combination of elements make practical the construction of a very compact folding panoramic camera well adapted to be carried in the pocket of the user.

Figure 1:
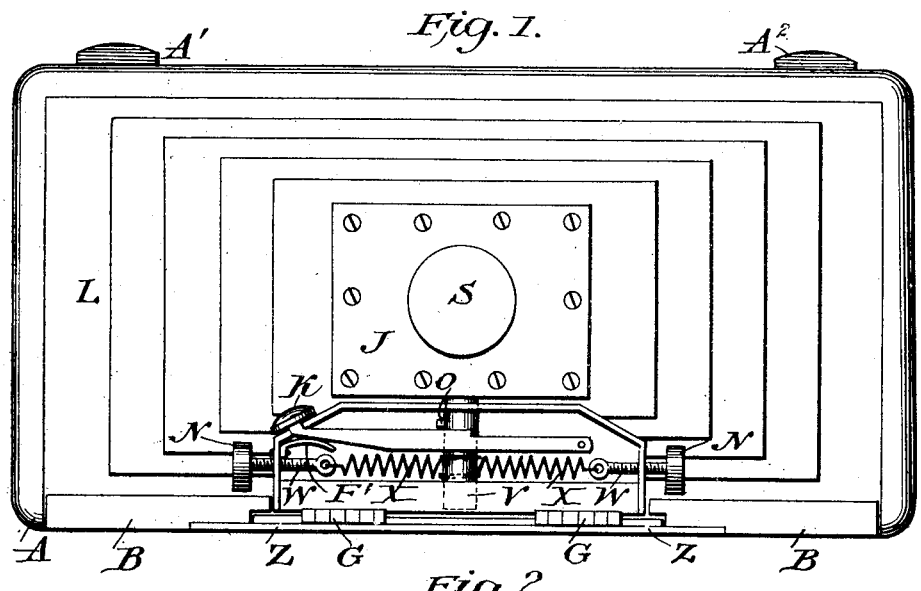
Figure 2:
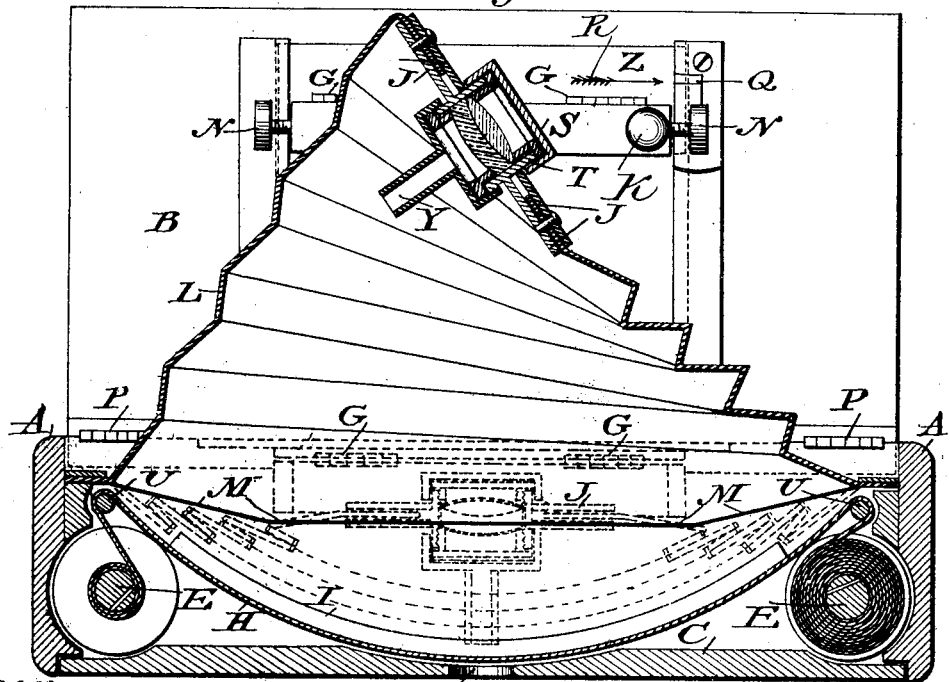

Figure 1 in the drawings is a front elevation showing the camera with the front opened down level with the base of the camera. Fig. 2 is a horizontal sectional plan view of the camera with the front opened down level with the base of the camera and with the bellows extended as adjusted for operation in making negatives.

In the drawings, in which similar letters of reference denote corresponding parts in both figures, at A is represented the camera-case; B, the folding front; C, the back; D, the observation-aperture in the back; E, the spools; H, the sensitized film; I, the lower one of the film-edge guides; M, the line at which the bellows connects with the interior of the camera-case; U, the guide-rollers; G, hinges on the slide; P, hinges of the folding front; L, the camera-bellows; Z, slide; R, arrow; Q, indicia-marks; K, push-button of the trigger; N, thumb-knobs on the adjusting-screws; T, lens-barrel; Y, lens-barrel backward extension; J, clamp-plates to hold the front of the bellows; S, lens-barrel cap; X, motor-springs; W, adjusting-screws; F, trigger; F', trigger-spring; O, pin to catch on the trigger; V, pivot-post for the lens-barrel; A' and A$^2$, the spool-keys.

In preparing the camera for use the operator removes the back of the camera and inserts a spool of cartridge-film at one side of the camera and passes the loose end of the black-paper wrapper of the film forward and around the guide-roller, and thence backward around and behind the circularly-positioned upper and lower film-edge guides, thence forward and around opposite guide-roller, and thence backward and attach to the reel-spool. Then the back of the camera must be shut to exclude light, and the winding-key may be wound until "No. 1" on the paper backing of the sensitized film comes opposite the sight-aperture in the back of the camera, and the camera is made ready for use by opening the folding front and sliding the slide on the folding front forward until the arrow points to the focusing-mark required. Next set the lens-barrel to point to the right, and it will be held there by the pin O on the pivot-post catching on the trigger-lever F. Next remove the lens-barrel cap S, and, holding the camera level and pointed to the view, touch the push-button K and the lens-barrel and lens will be rotated by the motor-springs X X, which springs have cords attached which pass around the pivot-post V, on which post the lens-barrel and lens swing. Immediately after making an exposure on a view the lens-cap should be replaced and the camera closed to prevent constant accumulative penetration of actinism through the bellows of the camera and which in time would produce fogging of the sensitized film.

I claim—

1. In a panoramic camera the combination of, a case, spool and reel devices placed in the right and left inside back corner-spaces of the case, circular-positioned stationary guides for the sensitized film, said guides placed and adapted to guide a sensitized film in the focus of the lens during the swinging of the lens and pivoted lens-barrel, rounded guides for the sensitized film, said rounded guides placed in a position approximate to the ends of the circular-positioned stationary guides, a bellows attached at its rear end to the interior of the case, a lens and lens-mount attached to close the front end of said bellows, a folding front on the camera-case, the lens-barrel pivoted to swing upon a supporting structure which is movably connected to the folding front of the camera-case, said bellows and lens-mount and supporting structure adapted to fold into the central concave front portion of the camera-case, and means for supporting adjusting and indicating the extent of projection of the lens when the bellows is extended.

2. In a panoramic camera the combination of, a case, spool and reel devices placed in the right and left inside back corner-spaces of the case, circular-positioned stationary guides for the sensitized film, said guides placed and adapted to guide a sensitized film in the focus of the lens during the swinging of the lens and pivoted lens-barrel, rounded guides for the sensitized film, said rounded guides placed in a position approximate to the ends of the circular-positioned stationary guides, a bellows attached at its rear end to the interior of the case, a lens and lens-mount attached to close the front end of said bellows, the lens-barrel pivoted upon an extensible supporting structure, said supporting structure adapted to fold together with the bellows and lens-barrel into the central concave front portion of the camera-case, and means for adjusting and indicating the extent of projection of the lens when the bellows is extended.

3. Combined with a panoramic camera, a lens and lens-barrel pivoted upon a movable supporting structure, said supporting structure having a pair of elastic springs attached, said springs connected on two sides of the pivot of the lens-barrel, and said springs adapted to exert a turning motion to said pivot of the lens-barrel.

4. Combined with a panoramic camera, a lens and lens-barrel pivoted upon a movable supporting structure, said supporting structure having a pair of elastic springs attached, said springs connected on two sides of the pivot of the lens-barrel, said spring adapted to exert a turning motion to said pivot of the lens-barrel, and tension-adjusting screws connected to said springs.

5. Combined with a panoramic camera, a lens and lens-barrel pivoted upon a movable supporting structure, said supporting structure having an elastic spring attached, said spring connected to the pivot of the lens-barrel, and said spring adapted to exert a turning motion to said pivot of the lens-barrel.

6. Combined with a panoramic camera, a lens and lens-barrel pivoted upon a movable supporting structure, said supporting structure having an elastic spring attached, said spring connected to the pivot of the lens-barrel, said spring adapted to exert a turning motion to the said pivot of the lens-barrel, and a tension-adjusting screw connected to said spring.

7. In a camera, the combination with a suitable casing having a front adapted to be turned down, said front having ways thereon, a slide-piece adapted to slide in said ways, a support-piece hinged to the said slide-piece and adapted to support the camera-front and lens, and of a bellows connecting the camera-front with the interior of the camera-case, whereby when the bellows is collapsed the lens and its support can pass into the camera-case while the slide remains in the ways upon the camera-front when it is closed.

In testimony whereof I affix my signature in presence of two witnesses.

DAVID HENDERSON HOUSTON.

Witnesses:
J. H. GALE,
C. D. FIELD.